United States Patent Office 2,902,255
Patented Sept. 1, 1959

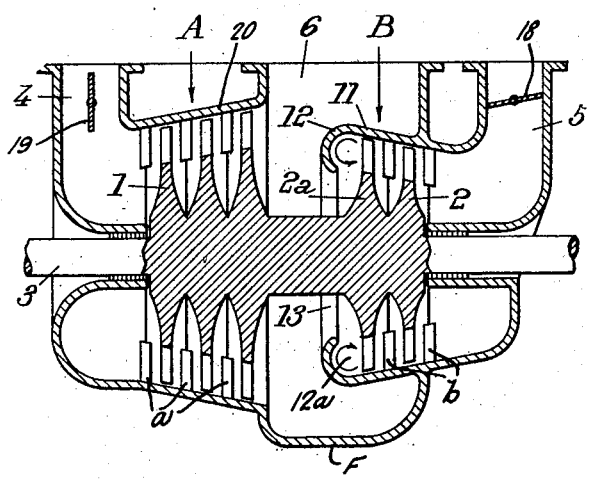

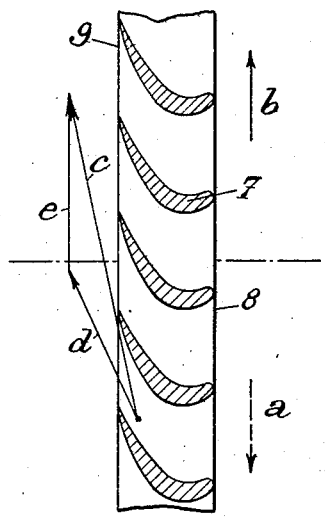
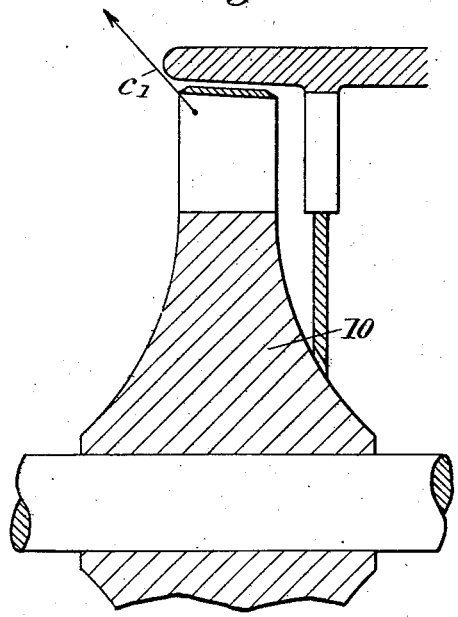
INVENTOR:
ROBERT HUBER

2,902,255

GAS TURBINES WHICH ARE FOR A TIME MECHANICALLY DRIVEN IN A DIRECTION OPPOSED TO THEIR NORMAL RUNNING DIRECTION

Robert Huber, Bellevue, France, assignor to Societe d'Etudes et de Participations, Eau, Gaz, Electricite, Energie, S.A., Geneva, Switzerland, a society of Switzerland Application August 14, 1953, Serial No. 374,371
Claims priority, application France September 29, 1952

2 Claims. (Cl. 253—70)

The present invention relates to gas turbines, that is to say turbines driven by hot gases under pressure generally constituted by a mixture of air under pressure and combustion gases, which are, for a time, mechanically driven in a direction opposed to their normal running direction. This case occurs chiefly in gas turbine plants serving to drive vehicles, and in particular ships, and which include two turbines, one for forward drive and the other for reverse drive, these turbines either having their shafts constantly coupled together, or both mounted on the same shaft, whereby the turbine which is not fed with power gases is mechanically driven by the other turbine in a direction opposed to its normal running direction.

The object of my invention is to provide turbines of this kind which are better adapted to meet the various requirements of practice, in particular concerning the losses which occur when they are driven in a direction opposed to their normal running direction.

The invention consists chiefly in providing one or several partitions which prevent at least an important portion of the air driven by the turbine rotating in a direction opposed to its normal running direction from escaping radially and which compel this air portion to rotate in a chamber formed by said partitions laterally with respect to the blades of the turbine wheel (or of the last wheel of the turbine when said turbine includes several wheels constituting as many expansion stages) and on the side of the outlet slots of said blades.

Preferred embodiments of my invention will be hereinafter described with reference to the accompanying drawings, given merely by way of example, and in which:

Fig. 1 diagrammatically shows in axial section a turbine system serving for instance to drive the propeller shaft of a ship, this system including a reverse drive turbine made according to the present invention;

Fig. 2 is a plan view, with the blades shown in section, of the turbine wheels of the turbine system of Fig. 1.

Fig. 3 is an axial section of a turbine system of the prior art.

The plant shown by Fig. 1 includes a frontward drive turbine A and a reverse drive turbine B, the first one practically always including several wheels 1 constituting as many expansion stages, whereas the second one may have either a single wheel or several wheels 2. Said wheels are surrounded by casings 20 and 11 respectively integral with the frame F of the power plant, said casings carry fixed blades $a$ and $b$.

Turbine wheels 1 and 2 are fixed on a common shaft 3 which is driven in the frontward drive direction if turbine A is fed with power gases and which is driven in the reverse direction if turbine B is fed with power gases. Each of these two turbines is provided with its own feed conduit designated respectively by 4 (turbine A) and 5 (turbine B) said conduits being provided with suitable control devices diagrammatically shown as constituted by shutters 19 and 18 respectively. The power gases, after they have expanded in either of turbines A and B, enter a common exhaust conduit or chamber 6.

It has been found that in systems of this kind the turbine which is not fed with power gases and which is mechanically driven by the other turbine in a direction opposed to its normal running direction causes relatively high losses of energy. These losses are due to the fact that the turbine which is driven by the other one in a direction opposed to its normal running direction works as a compressor and that the energy stored up in the air driven by said turbine acting as a compressor is practically wholly lost.

Figs. 2 and 3 are views intended to explain what takes place. Fig. 2 is a plan view of a portion of the blade system of a turbine wheel having curved blades 7 which form between them inlet slots 8 and outlet slots 9. The angle made by the blades with a plane at right angles to the wheel axis is much greater on the side of the inlet slots 8 than on the side of the outlet slots 9. When such a wheel is fed with power gases which enter between the blades through slots 8 and flow out through slots 9, it runs in the direction of arrow $a$. On the contrary, when said wheel is no longer fed with power gases but is mechanically driven in the reverse direction (arrow $b$) the blades of the wheel work as blades of a centrifugal compressor. Air is sucked in at the root of the blades and discharged toward the outlet openings 9, in a direction, shown by arrows $c$ and $c_1$, which is the resultant of the air velocity $d$ with respect to the blades and of the peripheral velocity of the blades themselves.

In known gas turbines, as diagrammatically shown in section by Fig. 3, the air set in movement by the turbine wheel 10 flows out freely in the direction of arrow $c_1$ into the exhaust conduit, so that wheel 10, when it is driven in a direction opposed to its own running direction, constantly accelerates new masses of air from a velocity little different from zero to a relatively high velocity indicated by arrows $c$, $c_1$. The energy thus necessary to accelerate constantly renewed masses of air is practically lost and explains the considerable losses caused by the mechanical driving of wheel 10 in the above mentioned direction of rotation.

It should further be noted that the compressor effect is particularly important on the side of the outlet slots of the blades of the last wheel of the turbine, since this side is immediately close to the discharge conduit, whereas this effect is practically negligible on the inlet side of the wheel due to the fact that, on the one hand, the guide ring is located on this side and, on the other hand, the inflow of fresh air is prevented by the closing of the shutter located in the intake conduit of the turbine.

In order to reduce said compressor effect on the side of the outlet slots of the turbine wheel (when the turbine includes only one wheel) or of the last wheel of the turbine (when the turbine includes several wheels constituting as many expansion stages), I provide on said side, according to my invention, at least one partition which prevents at least an important portion of the air driven by the turbine running in a direction opposed to its normal running direction from escaping radially and which compels this mass of air to revolve in a chamber 12a formed by said partition 12 laterally with respect to the blade system of the turbine.

Of course, this result may be obtained in many different ways. For instance, I may cause the wall 11 which surrounds the turbine wheel or wheels to extend beyond this wheel (or the last wheel) toward the inside of the common discharge conduit 6, the free edge of this extended portion of wall 11 being curved at 12, whereby a chamber 12a is created laterally of the last turbine wheel 2a (Fig. 1).

In this chamber, air is prevented from escaping directly into the discharge conduit 6 and is driven in rotation by wheel 2a about the axis of shaft 3. This air therefore forms a rotating pneumatic ring disposed laterally with respect to the outlet slots of the blade system of wheel 2a and which prevents it from exerting a substantial compressor effect.

Of course, some amount of air will nevertheless escape through the annular slot 13 which remains open between the inner edge 12 and the shaft 3 of the turbine but the amounts of fresh air entering through 13 to replace the air that has escaped will however be considerably less than the amounts of air set in movement in known turbines as diagrammatically shown by Fig. 3.

Of course, when the turbine B of Fig. 1 is fed with power gases, these gases, after they have expanded in this turbine, escape freely through slot 13 into the exhaust conduit 6 of the system.

In the embodiment of my invention which is illustrated, only the reverse drive turbine B is provided with partitions preventing the air set in movement by wheel 2 or 2a from escaping directly into the discharge conduit 6, whereas the frontward drive turbine A is not provided with such partitions. This is explained by the fact that it is generally the reverse drive turbine which is mechanically driven in a direction opposed to its own running direction, whereas the same circumstance rarely occurs for the forward drive turbine.

It should also be noted that the losses which are to be reduced by my invention practically do not exist in a steam turbine plant because, in steam turbines, due to the condensation of steam, there exists in the discharge conduit a very low pressure which renders negligible the compressor effect of the turbine mechanically driven in a direction opposed to its normal running direction. The circumstances in a gas turbine are fully different, in view of the fact that, in the discharge conduit 6 of a gas turbine, there is a pressure equal to that of the surrounding atmosphere.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A gas turbine power plant which comprises, in combination, a frame, a shaft journalled in said frame rotatable about an axis, at least one main bladed wheel fixed on said shaft, a casing rigid with said frame surrounding said wheel, fixed blades carried by said casing arranged to cooperate with said bladed wheel, power gas feed conduit means opening into said casing on one side of said bladed wheel, means, rigid with said frame, forming an exhaust chamber on the other side of said bladed wheel, a reversing turbine section including at least one bladed wheel fixed on said shaft on the other side of said exhaust chamber from said main bladed wheel, an annular casing rigid with said frame continuously surrounding said second mentioned bladed wheel, fixed blades carried by said last mentioned casing, power gas feed conduit means opening into said casing on the other side of said second mentioned bladed wheel from said exhaust chamber, said second mentioned bladed wheel and fixed blades being arranged so that when power gas is fed through said second mentioned feed conduit, said shaft is driven in the direction opposed to that in which it is normally running when power gas is fed through said first mentioned feed conduit, and a solid annular stationary partition on said second mentioned casing and forming an extension thereof into said exhaust chamber so as to have its circular inner edge located between said two bladed wheels, said extension being bent toward the axis of said shaft so that the distance of said circular inner edge from said axis is at most equal to the distance of the blade roots of said second mentioned bladed wheel from said axis, said partition being uninterrupted so that fluid cannot pass through it or between it and said annular casing.

2. A gas turbine power plant according to claim 1 in which the cross section of said annular partition by planes passing through the axis of said shaft are curved, with their concavity turned toward said second mentioned bladed wheel.

References Cited in the file of this patent

UNITED STATES PATENTS

| 791,674 | Curtis | June 6, 1905 |
| 1,252,956 | Schmidt | Jan. 8, 1918 |
| 1,542,453 | Hodgkinson | June 16, 1925 |
| 1,550,710 | Schmidt | Aug. 25, 1925 |
| 1,802,329 | Birmann | Apr. 28, 1931 |
| 1,967,963 | Metten | July 24, 1934 |
| 2,390,772 | Bloomberg | Dec. 11, 1945 |

OTHER REFERENCES

Doran: Abstract of application Serial Number 135,943, published June 5, 1951, 647 O.G. 311.